US012710991B2

(12) United States Patent
Wong et al.

(10) Patent No.: US 12,710,991 B2
(45) Date of Patent: Aug. 18, 2026

(54) PROVIDING AN OPTIMIZED SERVICE-BASED PIPELINE

(71) Applicants: ADVANCED MICRO DEVICES, INC., Santa Clara, CA (US); ATI TECHNOLOGIES ULC, Markham (CA)

(72) Inventors: Daniel Waihim Wong, Santa Clara, CA (US); Allen J. Porter, Markham (CA)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 595 days.

(21) Appl. No.: 17/487,480

(22) Filed: Sep. 28, 2021

(65) Prior Publication Data

US 2023/0102063 A1 Mar. 30, 2023

(51) Int. Cl.

*G06F 9/50* (2006.01)
*G06F 9/48* (2006.01)
*G06F 11/34* (2006.01)

(52) U.S. Cl.

CPC ................ *G06F 9/505* (2013.01); *G06F 9/48* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5044* (2013.01); *G06F 11/3433* (2013.01)

(58) Field of Classification Search

CPC ........ G06F 9/48; G06F 9/4843; G06F 9/4881; G06F 9/50; G06F 9/5005; G06F 9/5027; G06F 9/5044; G06F 9/505; G06F 2209/503

See application file for complete search history.

(56) References Cited

U.S. PATENT DOCUMENTS 8,233,000 B1 7/2012 Diard
9,898,795 B2 2/2018 Chen
10,148,736 B1 * 12/2018 Lee ...................... G06F 9/5066
10,445,850 B2 10/2019 Min et al.
10,896,064 B2 1/2021 Fong et al.

(Continued)

FOREIGN PATENT DOCUMENTS

EP 0384339 A2 8/1990

OTHER PUBLICATIONS

International Search Report and Written Opinion, PCT/US2022/044605, Jan. 9, 2023, 11 pages.

*Primary Examiner* — Charles M Swift

(57) ABSTRACT

An optimized service-based pipeline includes a resource manager that receives a request that includes a description of a workload from a workload initiator such as an application. The resource manager identifies runtime utilization metrics of a plurality of processing resources, where the plurality of processing resources includes at least a first graphics processing unit (GPU) and a second GPU. The resource manager determines, based on the utilization metrics and one or more policies, a workload allocation recommendation for the workload. Thus, the workload initiator can determine whether placing a workload on a particular processing resource is preferable based on runtime behavior of the system and policies established of the workload.

20 Claims, 8 Drawing Sheets

(56) References Cited

U.S. PATENT DOCUMENTS

| | | | | |
|---|---|---|---|---|
| 2006/0174246 | A1* | 8/2006 | Tamura | G06F 9/485 718/100 |
| 2011/0216078 | A1* | 9/2011 | Blinzer | G09G 5/363 345/502 |
| 2011/0292057 | A1 | 12/2011 | Schmit et al. | |
| 2014/0089511 | A1* | 3/2014 | McLean | G06F 9/5061 709/226 |
| 2014/0237472 | A1* | 8/2014 | Adogla | G06F 9/45533 718/1 |
| 2015/0286935 | A1* | 10/2015 | Mukherjee | G06F 9/505 706/46 |
| 2017/0109205 | A1* | 4/2017 | Ahuja | G06F 9/5094 |
| 2019/0312772 | A1* | 10/2019 | Zhao | G06F 9/5011 |
| 2020/0026560 | A1* | 1/2020 | Singh | G06F 9/5083 |
| 2020/0166982 | A1 | 5/2020 | Wang et al. | |
| 2021/0081842 | A1* | 3/2021 | Polleri | G06F 16/9035 |
| 2021/0089363 | A1 | 3/2021 | Bergsma et al. | |
| 2021/0271517 | A1* | 9/2021 | Guim Bernat | G06F 9/505 |
| 2022/0197651 | A1* | 6/2022 | Kumar | G06T 1/60 |
| 2023/0108001 | A1* | 4/2023 | Wong | G06F 9/505 718/103 |

* cited by examiner

100

PROVIDING AN OPTIMIZED SERVICE-BASED PIPELINE

BACKGROUND

Computing systems often include a number of processing resources (e.g., one or more processors), which can retrieve and execute instructions and store the results of the executed instructions to a suitable location or output a computational result. Applications executing on such computer systems can be given the opportunity to select a particular processing resource to execute a specific workload. For example, in a computing system that includes a central processing unit (CPU) and one or more accelerated processing devices such as graphics processing units (GPUs), the application can select a specific processor to execute an application workload. An application can determine what processing resources are resident in the computing system by querying the operating system of the computing system. In one example, a multimedia playback application can query the operating system for a list of devices capable of media playback and select, for example, a particular GPU for execution a video playback workload.

DETAILED DESCRIPTION

Figure 1:
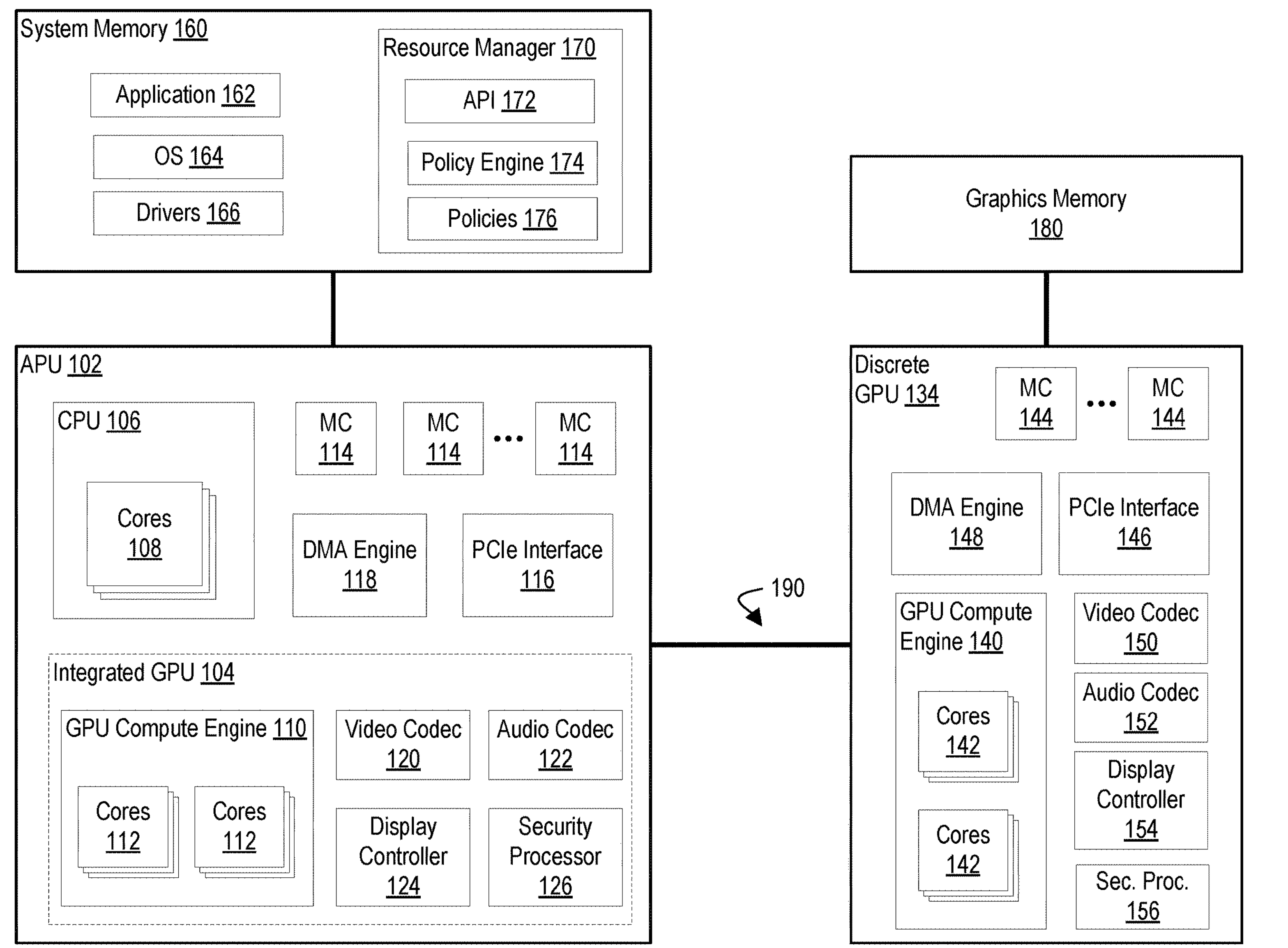
FIG. 1 sets forth a block diagram of an example system for providing an optimized service-based pipeline in accordance with some implementations of the present disclosure.

In some scenarios, when an application is ready to assign a workload for execution, the application first queries the operating system to determine what processing resources are available. For example, if the workload is a graphics (e.g., graphics rendering for gaming) or multimedia workload (e.g., multimedia playback), the application can first determine whether a GPU is present in the computing device. In some computing devices, there can be more than one GPU present. For example, the computing device can include an integrated CPU and GPU while also including a discrete GPU (i.e., on a separate chip). Furthermore, the application can determine, for example, what video codecs are supported by the GPUs to determine where the workload can be placed. For example, a streaming media service player can describe a particular workload (e.g., a movie) in terms of source resolution, bit rate, codecs, display resolution, frame rate, etc., and query the operating system for processing resources capable of executing the workload. The operating system can respond by identifying the GPUs that have the ability to execute the workload. Based on the operating system's response, the application can select a GPU and assign the workload to that GPU. For example, the application can assign the workload to the integrated GPU because the integrated GPU typically consumes less power than the discrete GPU. This can be of particular concern when the computing device is operating on battery power.

However, when the operating system provides the information about the capabilities of the computing device, it does so without any insight as to the runtime behavior of the system. That is, the operating system does not know how busy the video codec of the integrated GPU is. If the application decides to place the workload on the integrated GPU, which can also be running other video workloads such as a video conferencing application, the video codec of the integrated GPU can become oversubscribed. In other words, the application and the operating system do not have visibility as to the real runtime utilization of processing resources, and thus do not know if the computing device will be able to deliver the user experience expected for the workload.

To address these limitations, the present disclosure provides a mechanism for an optimized service-based pipeline in which an application or other workload initiator can receive a workload allocation recommendation that is based on runtime utilization metrics and policies for the workload, prior to assigning processing resources to the workload.

An implementation is directed to a method of providing an optimized service-based pipeline. The method includes receiving a request that includes a description of a workload from a workload initiator. The method also includes inspecting runtime utilization metrics of a plurality of processing resources based on the workload description, where the plurality of processing resources includes at least a first GPU and a second GPU. The method also includes determining, based on the utilization metrics and one or more policies, a workload allocation recommendation. In some implementations, the first GPU is an integrated GPU that is integrated with a CPU and the second GPU is a discrete GPU. In some implementations, the plurality of processing resources for which utilization metrics are identified further includes at least one of a video encoding/decoding accelerator, an audio encoding/decoding accelerator, a display controller, a bus interface controller, and a memory subsystem controller.

In some implementations, the method also includes exposing, to the workload initiator, an application programming interface (API) for submitting the request. In these implementations, the method also includes providing, to the workload initiator in response to the request, the workload allocation recommendation. In some implementations, the method also includes identifying the runtime utilization metrics and the one or more policies based at least on the description of the workload.

In some implementations, determining, based on the utilization metrics and one or more policies, a workload allocation recommendation includes predicting, based on the runtime utilization metrics, a utilization impact on the plurality of processing resources in a particular workload allocation. In these implementations, a plurality of workload allocations can be described in the one or more policies. These implementations can also include scoring a plurality of workload allocations based on one or more factors specified in the one or more policies.

In some implementations, the method also includes registering the workload initiator for a resource management notification and notifying the workload initiator of resource availability in response to a change in capabilities or a change in utilization.

A variation of the implementation is directed to an apparatus for providing an optimized service-based pipeline. The apparatus includes a computer processor, a computer memory operatively coupled to the computer processor, the computer memory having disposed therein computer program instructions that, when executed by the computer processor, cause the apparatus to receive a request that includes a description of a workload from a workload initiator. The computer program instructions also cause the apparatus to inspect runtime utilization metrics of a plurality of processing resources based on the workload description, where the plurality of processing resources includes at least a first GPU and a second GPU. The computer program instructions further cause the apparatus to determine, based on the utilization metrics and one or more policies, a workload allocation recommendation.

In some implementations, determining, based on the utilization metrics and one or more policies, a workload allocation recommendation includes predicting, based on the runtime utilization metrics, a utilization impact on the plurality of processing resources in a particular workload allocation. In these implementations, a plurality of workload allocations is described in the one or more policies. In some implementations, the computer program instructions also cause the apparatus to score a plurality of workload allocations based on one or more factors specified in the one or more policies.

In some implementations, the computer program instructions cause the apparatus to register the workload initiator for a resource management notification and notifying the workload initiator of resource availability in response to a change in capabilities or a change in utilization.

Yet another variation of the implementation is directed to a computer program product for providing an optimized service-based pipeline. The computer program product is disposed upon a computer readable medium and includes computer program instructions that, when executed, cause a computer to receive a request that includes a description of a workload from a workload initiator. The computer program instructions also cause the computer to inspect runtime utilization metrics of a plurality of processing resources based on the workload description, where the plurality of processing resources includes at least a first GPU and a second GPU. The computer program instructions also cause the computer to determine, based on the utilization metrics and one or more policies, a workload allocation recommendation.

In some implementations, determining, based on the utilization metrics and one or more policies, a workload allocation recommendation includes predicting, based on the runtime utilization metrics, a utilization impact on the plurality of processing resources in a particular workload allocation. In these implementations, a plurality of workload allocations can be described in the one or more policies. In some implementations, determining, based on the utilization metrics and one or more policies, a workload allocation recommendation is performed atomically for a plurality of streams in a workload. In these implementations, the computer program instructions also cause the apparatus to score a plurality of workload allocations based on one or more factors specified in the one or more policies.

In some implementations, the computer program instructions also cause the computer to register the workload initiator for a resource management notification and notify the workload initiator of resource availability in response to a change in capabilities or a change in utilization.

An implementation in accordance with the present disclosure will be described in further detail beginning with FIG. 1. Like reference numerals refer to like elements throughout the specification and drawings. FIG. 1 sets forth a block diagram of an example system 100 for providing an optimized service-based pipeline in accordance with some implementations of the present disclosure. The example system 100 of FIG. 1 can be implemented in a computing device such as a laptop or desktop personal computer, a server, a mobile device such as a smart phone or tablet, a gaming console, and so on. The example system 100 includes two GPUs 104, 134, although it will be appreciated by those of skill in the art that other systems can include more GPUs, or can use other types of accelerated processing devices, without departing from the spirit of the present disclosure.

In the example of FIG. 1, the example system 100 includes an accelerated processing unit (APU) that integrates a CPU 106 and a GPU 104 (referred to herein as an "integrated GPU"). The CPU 106 and the integrated GPU 104 can be implemented on the same chip and thus can share a number of components and interfaces. For example the CPU and GPU can share system memory 160, memory controllers 114, direct memory addressing (DMA) engines 118, bus interfaces such as a personal computing interface express (PCIe) interface 116, and other interfaces and adapters not depicted in FIG. 1 including network interfaces, universal serial bus (USB) interfaces, persistent storage interfaces, and so on. The CPU 106 includes one or more cores 108 (i.e., execution engines), cache structures (not shown), pipeline components (also not shown), and so on. The CPU 106 and other shared components are connected to the GPU 104 via a high-speed on-chip communications fabric (not shown).

In the example system 100 of FIG. 1, the integrated GPU 104 includes a GPU compute engine 110 that includes a number of single instruction multiple data (SIMD) processing cores 112 having many parallel processing units (not shown). The GPU compute engine 110 can also include other components not depicted in FIG. 1 such as geometry processors, rasterizers, graphic command processors, hardware schedulers, asynchronous compute engines, caches, data shares, and so on. In the example of FIG. 1, the integrated GPU 104 also includes hardware accelerators in the form of application specific integrated circuits or functional logic blocks such as a video encoder/decoder 120 (i.e., a "codec") for accelerated video encoding and decoding, an audio codec 122 for accelerated audio encoding and decoding, a display controller 124 for accelerated display processing, and a security processor 126 for accelerated security protocol enforcement and compliance.

In the example of FIG. 1, the APU 102 communicates with a discrete GPU 134 over an interconnect such as a PCIe interconnect 190. The PCIe interface 116 of the APU 102 and a PCIe interface 146 of the discrete GPU 134 communicate over the PCIe interconnect 190. In some examples, the APU 102 and the discrete GPU 134 are located on the same substrate (e.g., a printed circuit board). In other examples, the discrete GPU 134 is located on a video or graphics card that is separate from the substrate of the APU 102. The APU 102 and the discrete GPU 134 can implement a secure communication protocol over the PCIe interconnect 190 for sharing of sensitive data such as protected video content.

Like the integrated GPU 104, the discrete GPU 134 in the example of FIG. 1 includes a GPU execution engine 140 that includes multiple SIMD processing cores 142 having many parallel processing units (not shown). The GPU execution engine 140 can also include other components not depicted in FIG. 1 such as geometry processors, rasterizers, graphic command processors, hardware schedulers, asynchronous compute engines, caches, data shares, and so on. In the example of FIG. 1, the discrete GPU 134 also includes hardware accelerators in the form of application specific integrated circuits or functional logic blocks such as a video encoder/decoder 150 (i.e., a "codec") for accelerated video encoding and decoding, an audio codec 152 for accelerated audio encoding and decoding, a display controller 154 for accelerated display processing, and a security processor 156 for accelerated security protocol enforcement and compliance. The discrete GPU 134 also includes memory controllers 144 and DMA engines 148 for accessing graphics memory 180. In some examples, the memory controllers 144 and DMA engines 148 are configured to access a shared portion of system memory 160.

In the example system 100 of FIG. 1, the system memory 160 (e.g., dynamic random access memory (DRAM)) hosts an operating system 164 that interfaces with device drivers 166 for the processing resources (i.e., the APU and discrete GPU and their constituent components) described above. The system memory 160 also hosts one or more applications 162. Pertinent to this disclosure, the one or more applications can be graphics applications, multimedia applications, video editing applications, video conferencing applications, high performance computing applications, machine learning applications, or other applications that take advantage of the parallel nature and/or graphics and video capabilities of the integrated GPU 104 and the discrete GPU 134. The one or more applications 162 generate workloads (e.g., graphics rendering workloads, audio/video transposing workload, media playback workload, machine learning workloads, etc.) that are allocated to the integrated GPU 104 or the discrete GPU 134 (or a combination of both) by a call to the operating system 164. Readers of skill in the art will appreciate that the one or more applications can be variety of additional application types generating a variety of workload types, not all of which are identified here. However, the specific mention of application types and workload types within the present disclosure should not be construed as limiting application types and workload types to those that are identified here.

The system memory 160 also hosts a resource manager 170 that receives a request that includes a description of a workload from a workload initiator such as the application 162, inspects runtime utilization metrics of a plurality of processing resources including the integrated GPU 104 and the discrete GPU 134, and determines a workload allocation recommendation based on at least the dependence the utilization metrics and one or more policies. In some examples, the resource manager 170 is embodied in computer executable instructions that are stored on a tangible computer readable medium, and when executed by a processor, cause the system 100 to carry out the aforementioned steps, as well as other steps and operations performed by the resource manager that are described below.

In some implementations, the resource manager 170 includes an API 172 through which an application 162 can request a workload allocation recommendation from the resource manager 170 prior to the application assigning the workload to a particular GPU. The workload allocation recommendation, in this context, is a recommendation as to where (i.e., on which GPU) a workload should be placed (i.e., for execution of the workload). The workload allocation recommendation is based on, for example, the workload description, hardware capabilities such as processing resources in the system 100, the availability of various processing resources in the system 100, utilization metrics of various processing resources in the system 100, and one or more policies that pertain to the workload or type of workload. In some examples, the resource manager 170 includes a policy engine 174 that interprets one or more policies 176 that are relevant to determining the optimal allocation of the workload to the GPUs 104, 134 based on the current values of runtime utilization metrics of the processing resources. The workload allocation recommendation is then returned to the application 162, which the application 162 can then use to decide where to place the workload. In some variations, the resource manager 170 can communicate with the drivers 166 to obtain values for utilization metrics or can obtain values for utilization metrics by other mechanisms. In such examples, the drivers 166 can include a utilization monitor for a particular processing resource and an interface for providing utilization metric values to the resource manager 170. Additional details are provided below that discuss receiving a request that includes a description of a workload from a workload initiator, inspecting runtime utilization metrics of a plurality of processing resources including the integrated GPU 104 and the discrete GPU 134, and determining a workload allocation recommendation based on at least the dependence the utilization metrics and one or more policies, as well as other functions and advantages of the resource manager 170.

Figure 2:
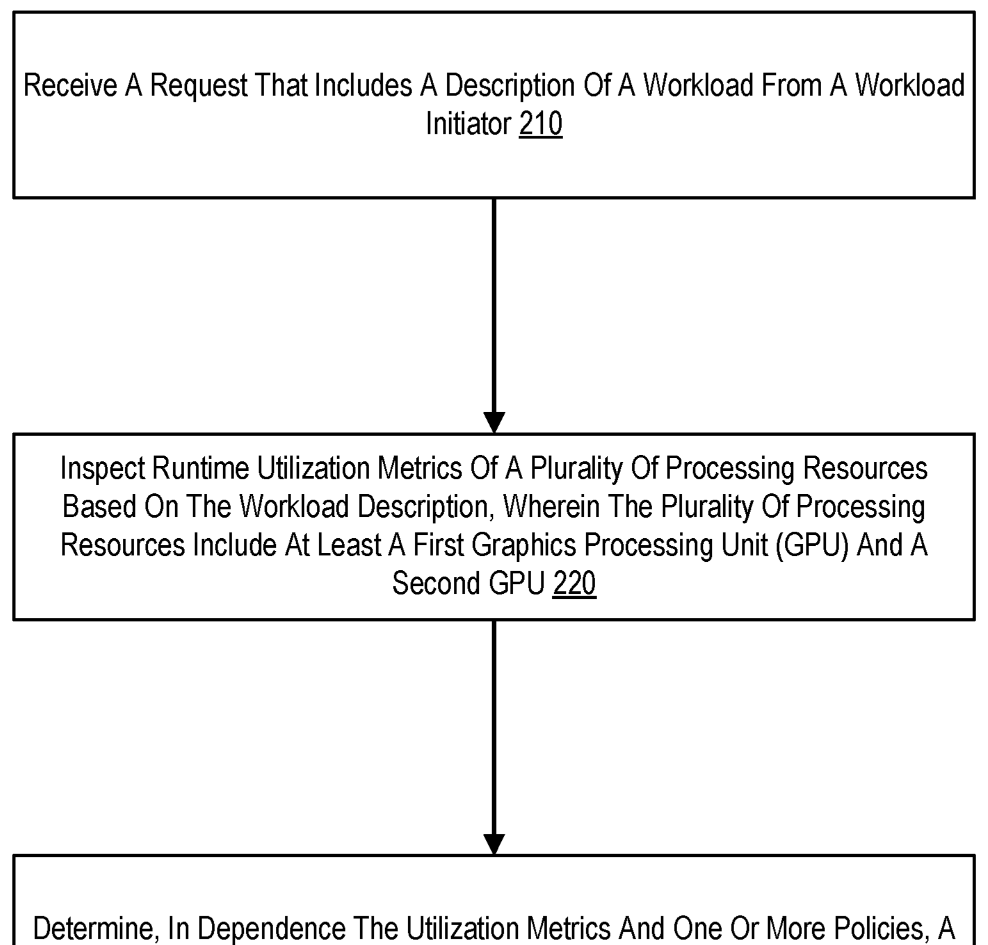
FIG. 2 sets forth a flow chart illustrating an example method of providing an optimized service-based pipeline in accordance with some implementations of the present disclosure.

For further explanation, FIG. 2 sets forth a flow chart illustrating an example method of providing an optimized service-based pipeline in accordance with some implementations of the present disclosure. The example method of FIG. 2 includes receiving 210 a request that includes a description of a workload from a workload initiator. In some examples, receiving 210 a request that includes a description of a workload from a workload initiator is carried out by receiving a query as a call through API exposed by the resource manager 170 to workload initiators. In an example where the workload includes video processing or graphics processing tasks, a computing system (e.g., the system 100 of FIG. 1) that that executes the workload can include multiple GPUs capable of executing the workload. In a particular example, the computing system includes an integrated GPU (e.g., the integrated GPU 104 of FIG. 1) and a discrete GPU (e.g., the discrete GPU 134 of FIG. 1). In such an example, the request from the workload initiator is a query to the resource manager 170 as to whether the workload should be placed on the integrated GPU or the discrete GPU, or a combination thereof. In some cases, the workload can include work items that can be executed on the integrated GPU and other work items that can be executed on the discrete GPU concurrently.

Various types of applications can be workload initiators, each with a variety of types of workloads. In some examples, the request from the workload initiator describes the type of workload, workload characteristics, processing requirements, and/or the performance expectations for the workload. For example, a media player application can have a workload identified as media playback workload that it intends to run on the computing system. In such an example, the description of the workload includes the source resolution, display resolution, bit rate, video codec, audio codec, and frame rate for the playback workload. As another example, a video conference application can have a workload identified as a transcode workload that is intends to run the computing system. In such an example, the description of the workload can include a source video codec, and target video codec, and a frame rate. The video conferencing application can also include an artificial intelligence (AI) workload that includes AI algorithms for gaze correction or removing/substituting a participant's background on screen.

In some examples, the description of the workload is provided using a descriptive language that is parsable by the resource manager. For example, the descriptive language can include a descriptor tag for bit rate, a descriptor tag for display resolution, a descriptor tag for a video encoding protocol, and so on. In these examples, the description of the workload is a structured description of the workload. In some examples, as will be described in more detail below, the descriptive language included in the request is parsable by a policy engine 174 of the resource manager 170.

The example method of FIG. 2 also includes inspecting 220 runtime utilization metrics of a plurality of processing resources based on the workload description. The processing resources include at least a first GPU and a second GPU. In some examples, inspecting 220 the runtime utilization metrics is carried out by the resource manager collecting the metrics from the integrated GPU and the discrete GPU. The utilization of the integrated GPU and the discrete GPU can be expressed in a variety of ways that will be recognized by those of skill in the art. For example, the utilization metrics of the integrated GPU and the discrete GPU can include processor utilization as a ratio of idle time to busy time, as a number of active processes, as a number of active threads, as power consumption, or combinations thereof. The integrated GPU and the discrete GPU can include various counters for providing these metrics. A metric relating to busy vs. idle can also factor a clock rate. For example, compute capabilities can be related to the throughput per clock, number of engines, and/or clock rate. The throughput can vary depending upon the workload. For example, a scaling/tone-mapping/color correction of high dynamic range video is a heavier workload per pixel than scaling/color correction of standard dynamic range material if run on one GPU. However, if that same workload were run on a different engine, the cost function could be significantly different. Thus, the clock rate and throughput per clock cycle can also be an expression of a utilization metric.

In some examples, the first GPU and its constituent resources (e.g., processing engines such as compute units, video codec, audio codec, display engine) and the second GPU and its constituent resources (e.g., processing engines such as compute units, video codec, audio codec, display engine) can be considered as a pool of resources, such that the individual resources of each GPU can be partitioned to support the workload. That is, one or more processing engines can be associated with a single workload. For example, a decode workload can be split across a video codec of the first GPU and a video codec of the second GPU. Thus, processing resources could be general compute resources such as and integrated GPU or discrete GPU, or specific compute resources such as a codec, shader, display engine, and so on.

In some examples, inspecting 220 runtime utilization metrics of a plurality of processing resources can also include collecting values of runtime utilization metrics from additional processing resources including multimedia accelerators such video codecs and audio codecs, display controllers, security processors, memory subsystems such as DMA engines and memory controllers, and bus interfaces such as a PCIe interface. The utilization of multimedia accelerators, display controllers, security processors, and other accelerators can be expressed by metrics such as a ratio of idle time to busy time, as a number of active processes, as a number of active threads, as power consumption, or combinations thereof. These components can include various counters for providing these metrics, which can be inspected, for example, via a call to a corresponding driver. Memory subsystem utilization can be expressed by metrics such as the number of read packets and the number of write packets issued over the interface within a current time period, the current utilization of ingress and egress queues or buffers, data transfer times and latency, and so on. Bus interface utilization can be expressed by metrics such as bandwidth (e.g., peak bandwidth and average bandwidth). In particular, the utilization of the bus interface between the APU and the discrete GPU is important when a workload is split between the integrated GPU and the discrete GPU, such that the bandwidth of the bus interface poses a constraint on the ability of the integrated GPU and the discrete GPU to share result data.

In some examples, inspecting 220 runtime utilization metrics of a plurality of processing resources based on the workload description is carried out by the resource manager querying respective drivers of a plurality of processing resources to obtain the utilization metrics at runtime prior to the workload initiation. For example, in response to the request including the description of the workload from the workload initiator, the resource manager determines particular components (e.g., compute units, shaders, codecs, etc.) of the processing resources that will be required to support execution of the workload based on the workload description. Then, the resource manager queries the respective drivers of the plurality of processing resources to for utilization metrics to construct a utilization state of the computing device as it pertains to the workload that will potentially be allocated on those processing resources. For example, if the workload description indicates the workload is a media playback workload, the resource manager will inspect utilization metrics of the video codec and the audio codec, among others, to construct the utilization state as it pertains to the media playback workload.

The example method of FIG. 2 also includes determining 230, based on the utilization metrics and one or more policies, a workload allocation recommendation. In some examples, determining 230 the workload allocation recommendation is carried out by the resource manager determining, based on at least the utilization state of the computing device and its constituent processing resources, to which processing resources or combination of processing resources the workload can be allocated without oversubscribing those resources. In these examples, the resource manager identifies the processing resources that are available in the computing device and determines which of the processing resources are capable of executing the workload based on the description of the workload. For example, based on the processing resources that are available (e.g., in the integrated GPU and the discrete GPU) and the capabilities of those processing resources that match the requirements of the workload (e.g., supported video encode/decode standards), the resource manager inspects the utilization state of the available and capable processing resources in determining 230 the workload allocation recommendation.

In these examples, determining 230 the workload allocation recommendation can also include determining a recommended placement for the workload based on one or more policies given that such a placement does not result in oversubscription of the processing resources. As an example, a policy can state that workloads should be placed on the integrated GPU if possible due to lower overall power consumption by the APU with the added workload. Thus, if the new workload is not predicted to result in oversubscription of the integrated GPU, the workload allocation recommendation is that the workload be placed in the integrated GPU. In some examples, determining 230 a workload allocation recommendation is performed atomically for a plurality of streams in a workload. Thus, when there is a workload that includes multiple streams (e.g., a transcode workload where there is a video encode stream and a video decode stream), a workload allocation recommendation is determined atomically for each stream in the workload. For example, a workload allocation recommendation can be made for a video encode stream and a second workload allocation recommendation can be made for a video decode stream of the same workload.

In some examples, determining 230 the workload allocation recommendation includes identifying a policy based on the type of workload to which the request pertains. There can be factors other than power consumption that drive a policy. In some variations, a policy for gaming workloads is based on performance factors where one processing resource performs a task better than another. In one example, a policy can state that a gaming workload should be placed on the discrete GPU as long as the gaming workload is not predicted to result in oversubscription of the discrete GPU. In some variations, a policy is based on capability. For example, a policy can state that video playback should be performed using the AV1 codec. As one example, it can be the case that one of the GPUs includes an AV1 codec accelerator while the other does not. Thus, determining 230 a workload allocation recommendation can also include determining the capabilities of the processing resources available in the system. In some examples, a workload allocation can be revoked by the resource manager based on a new workload or based on updated utilization information.

In some implementations, determining 230 the workload allocation recommendation can also include identifying the component processing resources required by the workload and identifying the utilization metrics for those resources. As one example, where the video codec of the integrated GPU is at high utilization, a graphics workload that does not utilize the video codec could be placed on the integrated GPU without resulting in oversubscription of the resources. By contrast, a video playback workload utilizing the video codec would result in oversubscription of the video codec. In this example, despite a low power consumption policy, the workload allocation recommendation would be to place the workload on the discrete GPU. Thus, if the addition of the workload will result in the oversubscription of any component processing resource (e.g., the video codec) of the processor system (e.g., the integrated GPU), the resource manager determines that it is preferable to place the workload on another system (e.g., the discrete GPU). In some examples, policies can describe expectations for types of workloads. For example, a policy can indicate that a 4K high dynamic range (HDR) workload at 60 frames per second can be expected to consume N number of cycles and M amount of memory bandwidth.

In some examples, a policy can state that workloads should be allocated to maximize utilization of both the integrated GPU and the discrete GPU. Consider, as an example, a video editing workload that can include multiple decode and encode streams. In such an example, the resource manager can determine that a first decode stream should be placed on the integrated GPU based on the availability of the integrated GPU and a first encode stream should be placed on the discrete GPU based on the availability of the discrete GPU. For a second decode stream, the resource manager can determine, based on the utilization state of the integrated GPU and the discrete GPU, that the second decode stream should be placed on the integrated GPU and recommend this workload allocation. For a third decode stream, the resource manager can determine, based on the utilization state of the integrated GPU and the discrete GPU, that the third decode stream should be placed on the discrete GPU and recommend this workload allocation.

Considering an example of a transcode workload from the High Efficiency Video Coding (HEVC) format to the Advanced Video Coding (AVC) format, the resource manager can determine, based on availability, that the HEVC decode stream should be placed on the integrated GPU and make this workload allocation recommendation. For the AVC encode stream, the resource manager can determine, based on expected utilization, that the AVC encode stream should be placed on the discrete GPU and make this workload allocation recommendation.

Consider an example of a transcode workload from the AOMedia Video 1 (AV1) format to the AVC format. In this example, the AV1 format is only supported by the discrete GPU. In such an example, the resource manager can determine, based on capability of the system, that the AV1 decode stream should be placed on the discrete GPU and make this workload allocation recommendation. Based on expected utilization, the resource manager can determine that the AVC encode stream should be placed on the integrated GPU and make this workload allocation recommendation.

Figure 3:
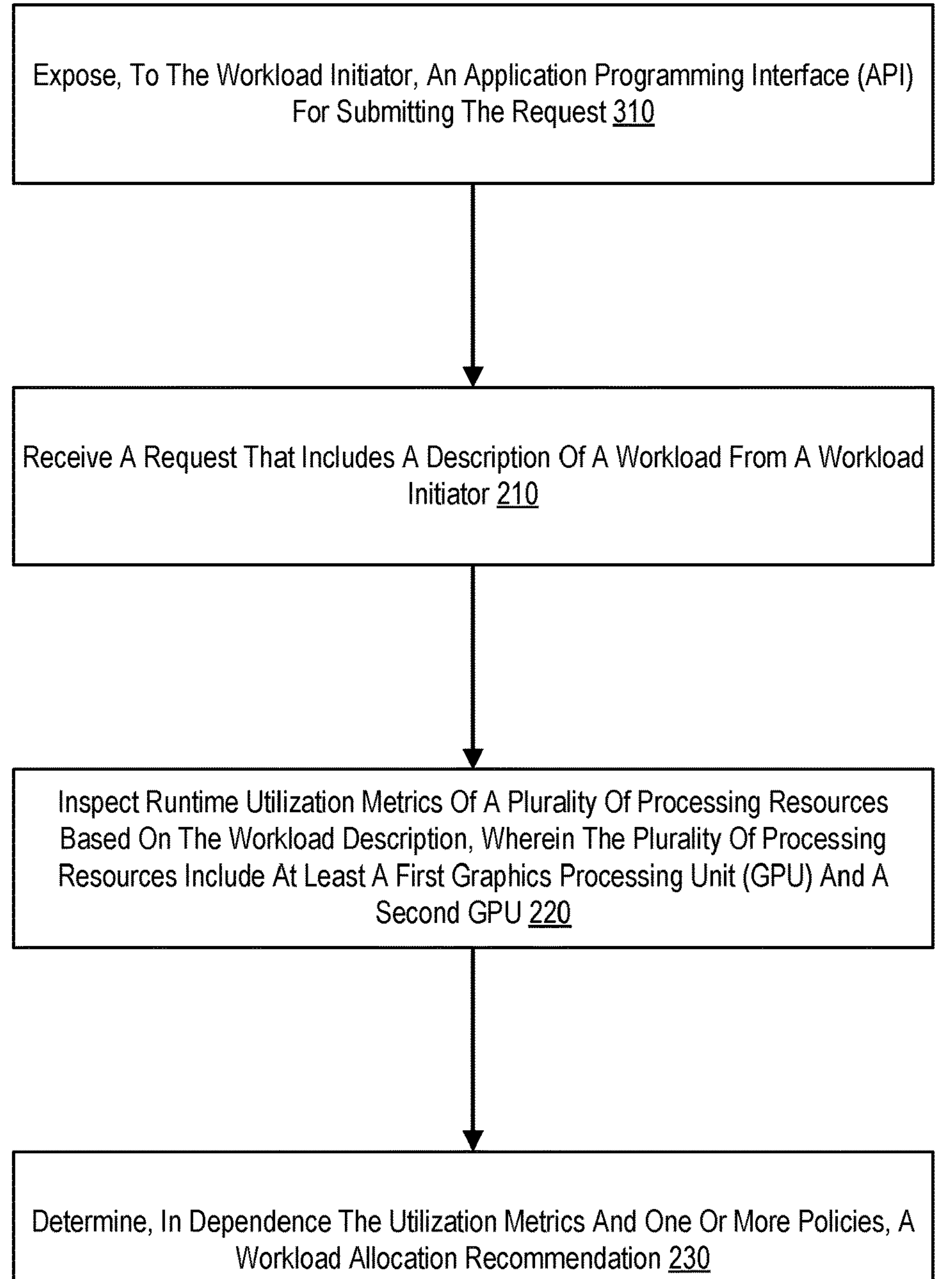
FIG. 3 sets forth a flow chart illustrating an example method of providing an optimized service-based pipeline in accordance with some implementations of the present disclosure.

For further explanation, FIG. 3 sets forth a flow chart illustrating an example method of providing an optimized service-based pipeline in accordance with some implementations of the present disclosure. The method of FIG. 3 is similar to that of FIG. 2, except that, the example of FIG. 3 includes exposing 310, to the workload initiator, an application programming interface (API) for submitting the request. In some implementations, the resource manager exposes an API to an application (e.g., application 162 of FIG. 1) that intends to run a workload on the computing system. The API provides a mechanism for applications to submit a workload description (e.g., using the descriptor language discussed above) and request a recommendation for a workload allocation among the processing resources of the computing system. In some variations, the descriptors are added as arguments to the API call. For example, prior to deciding whether to place the workload on the integrated GPU or the discrete GPU, the application can call the resource manager to request a recommendation for a workload allocation. In making the API call, the application can include a structured description of the workload using the descriptor language. By providing the API to allow the workload initiator to request the workload allocation recommendation, the workload initiator is given the opportunity to identify, using runtime characteristics of the integrated GPU and the discrete GPU, where the workload can be placed without resulting deteriorated performance (e.g., from oversubscribing the processing resources), rather than selecting a GPU for the workload without regard to its current utilization. The API call is made by the application at the outset of the workload (e.g., at the outset of a media playback initiation) and is not made for each work item in the workload (e.g., every frame decode). In some examples, the first GPU and the second GPU can be abstracted such that the processing resources appear as a single system, and an interface maps to multiple subsystems (e.g., codecs, compute units, etc.).

Figure 4:
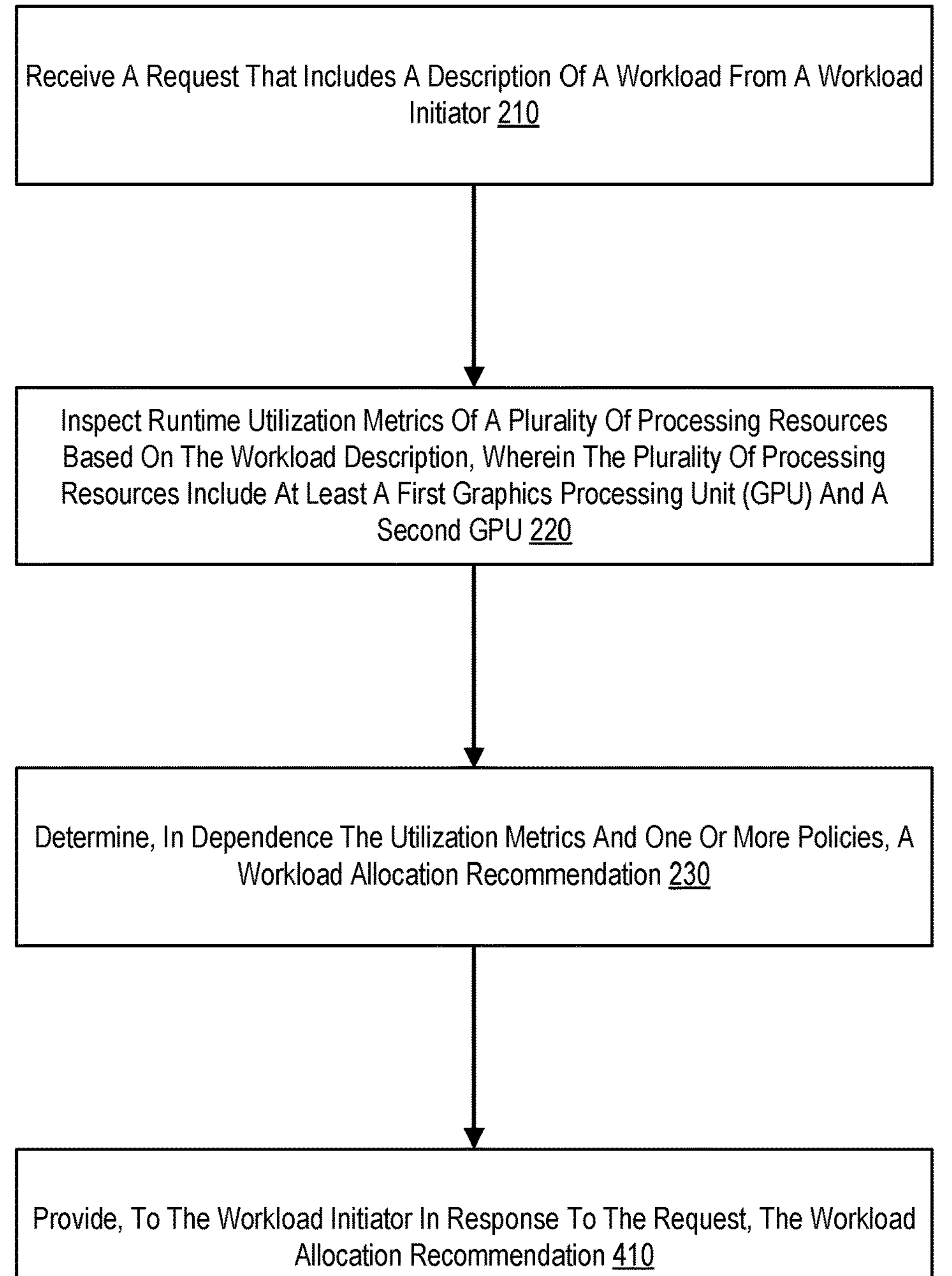
FIG. 4 sets forth a flow chart illustrating an example method of providing an optimized service-based pipeline in accordance with some implementations of the present disclosure.

For further explanation, FIG. 4 sets forth a flow chart illustrating an example method of providing an optimized service-based pipeline in accordance with some implementations of the present disclosure. FIG. 4 is similar to that of FIG. 2 except that FIG. 4 includes providing 410, to the workload initiator in response to the request, the workload allocation recommendation. For example, the resource manager returns the workload allocation recommendation to the requesting application that initiated the request. In some examples, the result is returned as a response to an API call. The workload allocation recommendation indicates whether the workload should be placed on the integrated GPU or the discrete GPU. In some variations, the workload allocation recommendation indicates where particular work items within the workload should be placed, such that certain work items (e.g., composition) should be placed on the integrated GPU while other work items (e.g., video decode) should be placed on the discrete GPU. In some examples, a policy associated with the type of workload describes how the resource manager should respond to the workload initiator. For example, the policy can indicate that, if oversubscription will result from placement on either GPU, the resource manager should return a response indicating the placement preferred by the policy with a warning that oversubscription may result. In some cases, the resource manager can return a result indicating a predicted utilization impact on each GPU such that the application can decide, based on the predicted utilization impact, where to place the workload.

Figure 5:
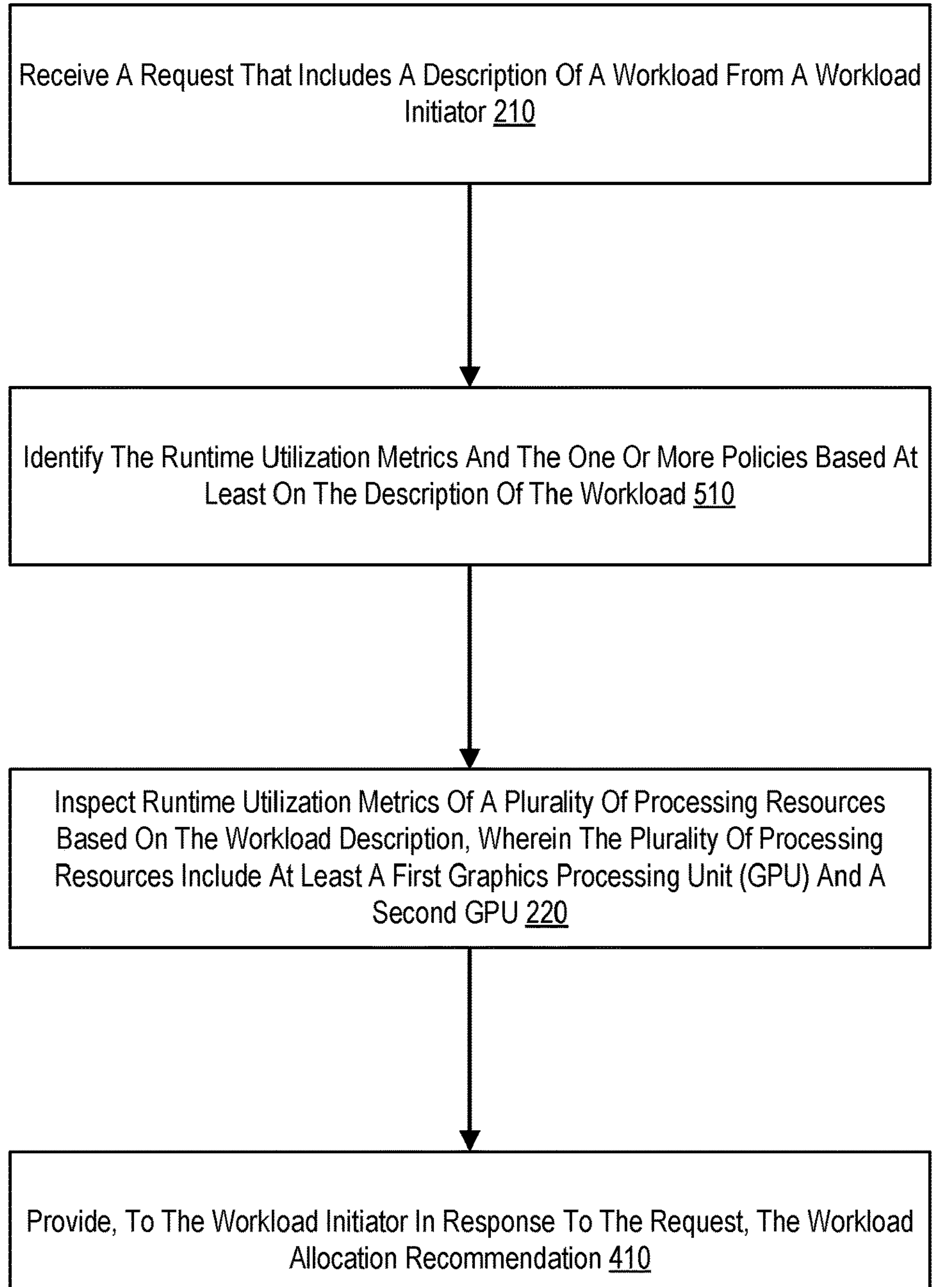
FIG. 5 sets forth a flow chart illustrating another example method of providing an optimized service-based pipeline in accordance with some implementations of the present disclosure.

For further explanation, FIG. 5 sets forth a flow chart illustrating an example method of providing an optimized service-based pipeline in accordance with some implementations of the present disclosure. FIG. 5 includes identifying 510 the runtime utilization metrics and the one or more policies based at least on the description of the workload. In some examples, identifying 510 the runtime utilization metrics and the one or more policies based at least on the description of the workload is carried out by the resource manager determining a type of workload from the workload description. From the type of workload, the resource manager can identify processing resources (e.g., shader engines, video or audio codec accelerators, memory subsystem or bus interfaces, etc.) that will be required by the workload. Additionally or alternatively, the resource manager can identify requisite processing resources from the workload characteristics (e.g., video or audio encoding parameters, upscaling resolution parameters, security parameters, etc.) in the structured description of the workload. Based on the identified processing resources, the resource manager inspects the utilization metrics of those resources. Utilization metrics of the processing resources can be continuously monitored and sampled or can be obtained in response to the request.

Based the type of workload obtained from the workload description, one or more policies for the workload are also identified. For example, each type of workload (e.g., media playback, video editing, video conferencing, etc.) can have a set of policies associated with it. That set of policies describes, to the policy engine (e.g., policy engine 174 of FIG. 1), how to make the determination for a workload allocation recommendation. For example, the set of policies can specify preferences for where the workload or components of the workload should be placed, enumerated priorities for aspects of the workload (e.g., speed, power consumption, image quality, etc.), base requirements for the workload (e.g., frame rate, latency, output resolution), critical resources for the workload (e.g., which resources are heavily utilized by the workload), security and protection policies, and so on. In some examples, the set of policies indicates which utilization metrics should be inspected and relied upon in determining the workload allocation recommendation.

Figure 6:
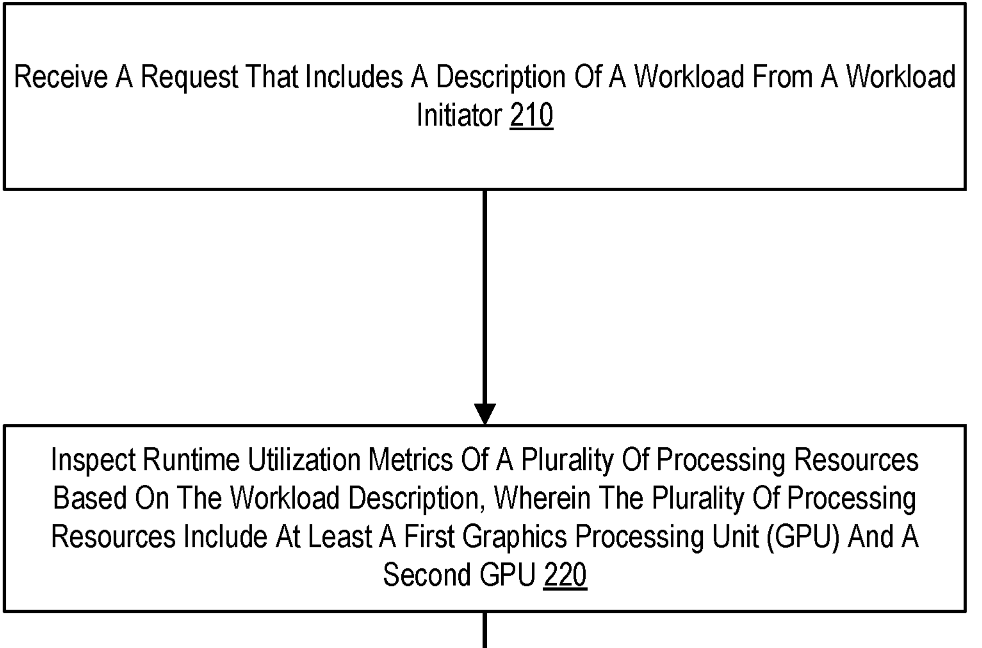
FIG. 6 sets forth a flow chart illustrating another example method of providing an optimized service-based pipeline in accordance with some implementations of the present disclosure.

For further explanation, FIG. 6 sets forth a flow chart illustrating an example method of providing an optimized service-based pipeline in accordance with some implementations of the present disclosure. In the example method of FIG. 6, determining 230 the workload allocation recommendation includes predicting 610, based on the runtime utilization metrics, a utilization impact on the plurality of processing resources in a particular workload allocation. In some implementations, predicting 610 the utilization impact on the plurality of processing resources in a particular workload allocation is carried out by the resource manager identifying a particular workload allocation. For example, the particular workload allocation can be the placement of the entire workload on the integrated GPU, or on the discrete GPU, or a distribution of the workload across the integrated GPU and the discrete GPU. For the particular workload allocation, and based on the type of workload and the runtime utilization metrics, the resource manager predicts an impact on the utilization of the processing resources in the proposed workload allocation. For example, based on the type of workload, the resource manager can determine that the GPU cores of the integrated GPU will be oversubscribed if the new workload is added. In some variations, the resource manager predicts a numerical impact of the new workload. For example, based on the type of workload, the resource manager can determine that the utilization of the GPU cores of the integrated GPU will increase by 20% if the workload is placed on the integrated GPU. In some variations, the impact on utilization can be predicted based on trends, models, and/or prior utilization observations of the processing resources when executing a particular type of workload.

As mentioned above, the resource utilization analysis is not limited to a particular resource, but can apply to the system as a whole. Consider an example of a proposed workload allocation for a transcode workload in which the video decode and the composition jobs can be placed on the video codec and shader engine of the discrete GPU, and the video encode job can be placed on the video codec of the integrated GPU. In this example, while both GPUs can accommodate the workloads without overutilization, the transfer of the composition over the PCIe interconnect from the discrete GPU to the integrated GPU will result in overutilization of this interface. Considering another example concerning video playback, the playback workload can be accommodated by either the integrated GPU or the discrete GPU; however, because the integrated GPU competes with the CPU for access to system memory through the memory controllers, placement of the workload on the integrated GPU can result in too much latency to deliver the required user experience. In such a scenario, it may be desirable to place the workload on the discrete GPU even through the power consumption is higher.

In some examples, one or more policies associated with a workload type specifies multiple proposed workload allocations. Using a transcode workload as an example, a policy can specify the that the first preference is to place the video decode and the composition on the video codec and shader engine of the discrete GPU and the video encode on the video codec of the integrated GPU. The policy can specify the that the second preference is to place the entire workload on the discrete GPU. The policy can specify the that the third preference is to place the entire workload on the integrated GPU. In some variations, a policy can be overridden by resource constraints. For example, if one of the GPUs does not support content protection and the video workload includes protected content, the workload must be placed on the GPU that supports content protection despite a policy that would place the workload on the GPU that does not support content protection.

Figure 7:
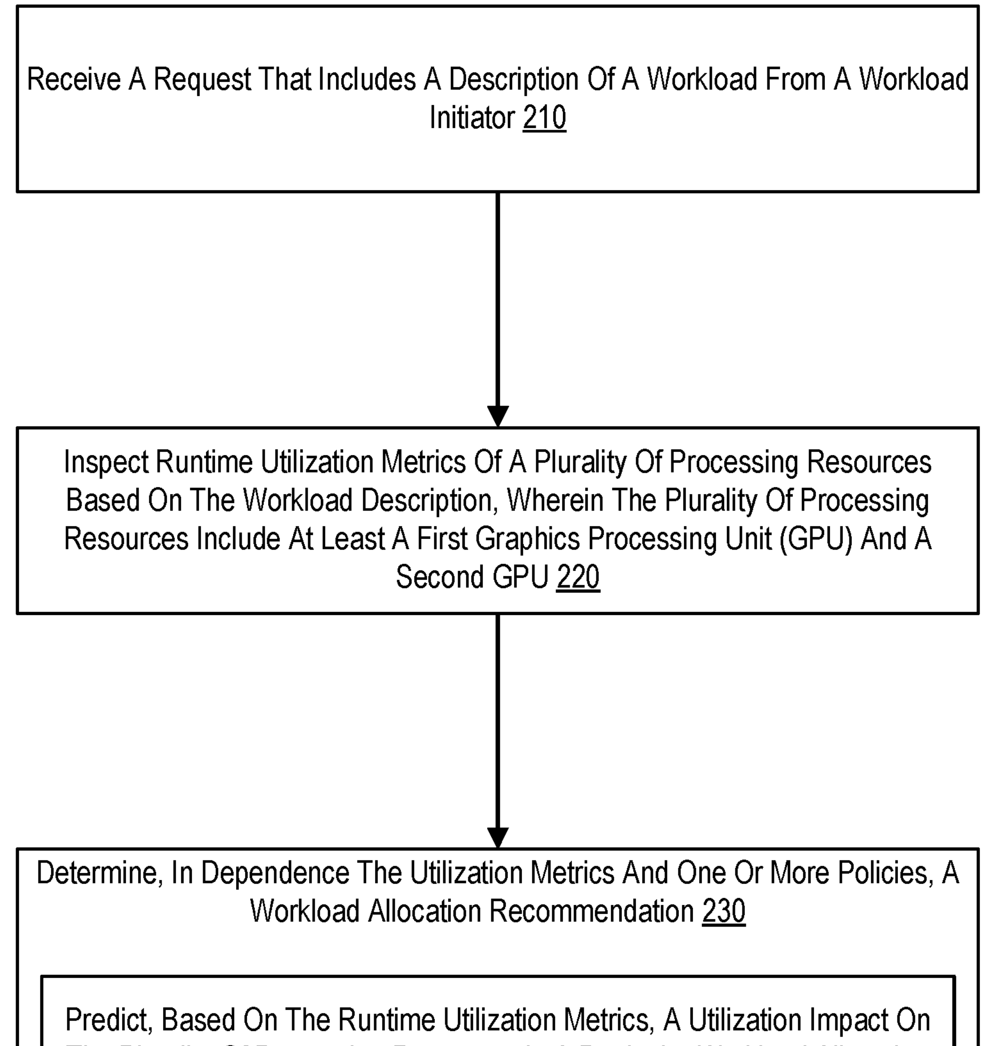
FIG. 7 sets forth a flow chart illustrating another example method of providing an optimized service-based pipeline in accordance with some implementations of the present disclosure.

For further explanation, FIG. 7 sets forth a flow chart expanding the method set forth in FIG. 6. After predicting the utilization impact of a plurality of particular workload allocations, the method of FIG. 7 continues by scoring 710 the plurality of workload allocations based on one or more factors specified in the one or more policies. In some implementations, scoring 710 the workload allocations is carried out by the policy engine of the resource manager calculating a score for multiple possible workload allocations. The score is calculated based on factors identified in the policy or set of policies. For example, the score can be connected to a performance characteristic of a particular workload allocation (e.g., output frame rate, output resolution, etc.), a power consumption or efficiency factor, a load balancing factor, and so on. Continuing the transcode example above, the score can be based on the frame rate. Suppose that a first workload allocation that places video decode and the composition jobs on the discrete GPU and the video encode job on the integrated GPU can achieve a frame rate of 200 frames per second; a second workload allocation that places the entire workload on the discrete GPU can achieve a frame rate of 150 frames per second; and a third workload allocation that places the entire workload on the integrated GPU can achieve a frame rate of 100 frames per second. If these workload allocations are scored based on frame rate, as specified in a policy for transcode workloads, the first workload allocation will be determined as the recommended workload allocation. However, if in this same example the PCIe interface utilization was substantially higher, the frame rate of the first workload allocation may decrease to 125 frames per second due to the transfer of data between the integrated GPU and the discrete GPU. In this example, the second workload allocation would be preferred based on a scoring system that uses only frame rates.

In some variations, the factors used to score a particular workload allocation are weighted. Continuing the transcode example, the policy can weight frame rate and output resolution such that frame rate is weighted more than output resolution. In the example where PCIe utilization is high, the frame rate of 200 frames per second can be achievable if the output resolution is lowered such that less data is transmitted over the PCIe interface. In such a scenario, the second workload allocation and the third workload allocation are still limited by performing both encode and decode in the same system and cannot decrease the output resolution to increase this performance. However, the first workload allocation can reduce the output resolution to increase data rates over the PCIe interface. Thus, where frame rate is weighted higher than output resolution, the first workload allocation scores higher than the other two.

In the above examples, the policy engine calculates the score for each workload allocation. These workload allocations can be specified in the policies themselves, as mentioned above. The workload allocation with the highest score is then identified by the resource manager to the workload initiator as the recommended workload allocation for the workload. In some examples, the score can include an indication as to whether the workload allocation will result in oversubscription of the resources.

Figure 8:
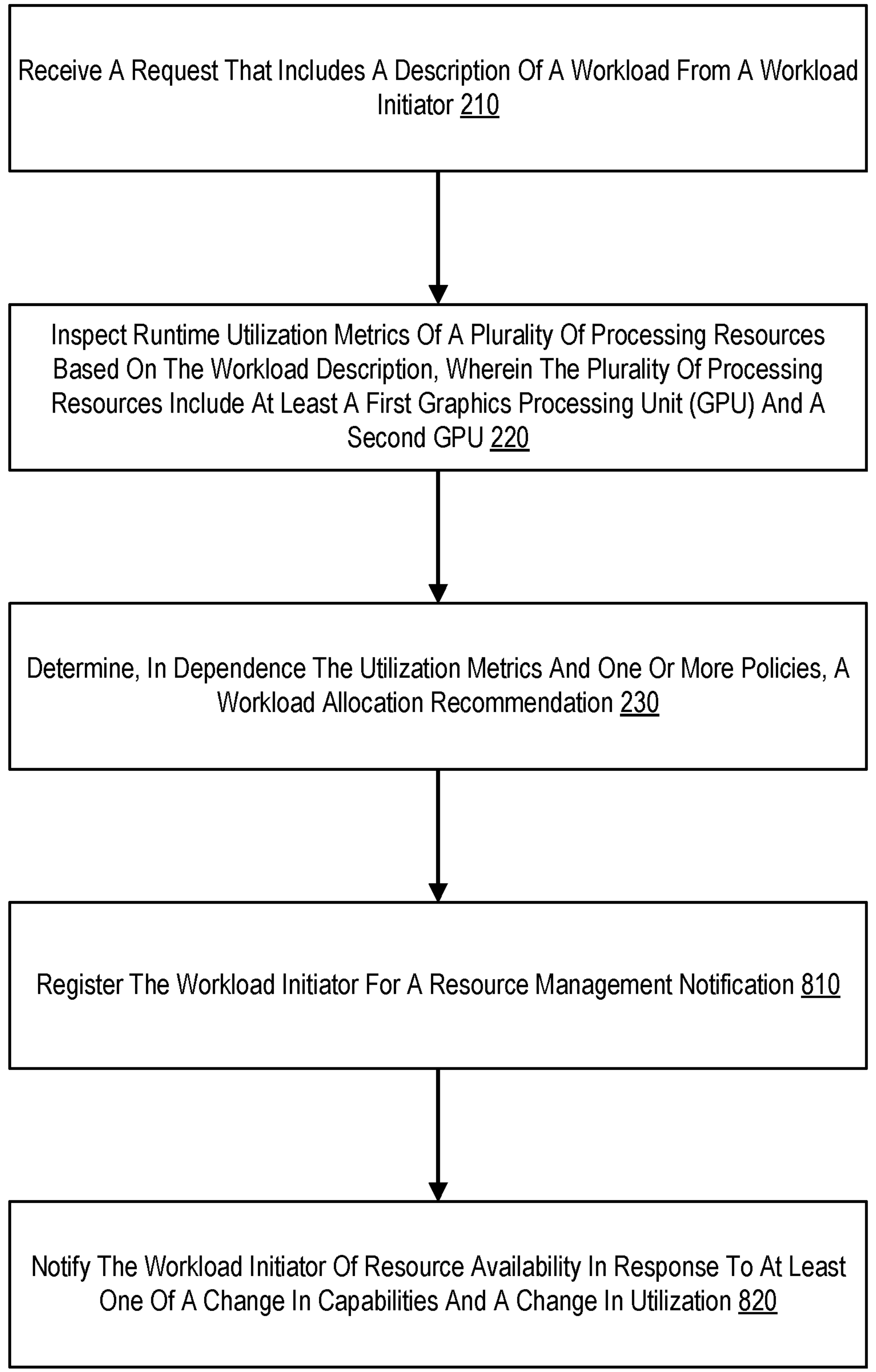
FIG. 8 sets forth a flow chart illustrating another example method of providing an optimized service-based pipeline in accordance with some implementations of the present disclosure.

For further explanation, FIG. 8 sets forth a flow chart illustrating an example method of providing an optimized service-based pipeline in accordance with some implementations of the present disclosure. The example method of FIG. 8 includes registering 810 the workload initiator for a resource management notification. In some implementations, registering 810 the workload initiator for a resource management notification is carried out by the resource manager receiving an indication that the application requests registration for resource management notifications. When registration for resource management notifications is requested, the resource manager will inform the application when there is a change to resource utilization or resource capabilities that can affect the workload allocation previously recommended. The application can request registration via an API call to the resource manager. In some variations, the application can request registration as part of the API call making the initial request for the workload allocation recommendation. In other examples, the application can request registration in a separate API call.

The example method of FIG. 8 also includes notifying 820 the workload initiator of resource availability in response to at least one of a change in capabilities and a change in utilization. In some implementations, notifying 820 the workload initiator of resource availability in response to at least one of a change in capabilities and a change in utilization is carried out by the resource manager detecting a change in the computing system's capabilities or the utilization of the computing resources. For example, the resource manager can detect that a competing application has closed thus increasing the availability of processing resources. The resource manager can detect that the computing system has switched from battery power to connected power, thus reducing the significance of the discrete GPU's large power consumption. In response to detecting such a change, the resource manager notifies the application that has registered for such notifications. In some examples, the notification by the resource manager invites the application to submit a new request for a workload allocation recommendation. In other examples, the notification includes an updated workload allocation recommendation. In some examples, the resource manager detects whether applications are still active and have not crashed or shutdown uncleanly to release their allocated resources.

In view of the foregoing, readers of skill in the art will appreciate that implementations in accordance with the present disclosure offer a number of advantages. Implementations provide applications that intend to initiate workloads on a multi-GPU system with visibility into the runtime behavior of the system, such that the application does not place workloads on resources that are overutilized. Further, policies for features/workload types provide a definition that allows a policy engine of the resource manager to make the optimal workload allocation recommendation for that feature/workload type. Thus, the system can guarantee that the workload will be performed as expected, or the application will be notified prior to initiating workload that performance cannot be guaranteed. In this way, the user experience is improved.

Implementations can be a system, an apparatus, a method, and/or logic circuitry. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A method of providing a service-based pipeline, the method comprising:

inspecting, in response to a request that includes a description of a workload received from a workload initiator, runtime utilization metrics of a plurality of processing resources, wherein the plurality of processing resources includes at least a first graphics processing unit (GPU) and a second GPU;

generating, by a resource manager and based on the utilization metrics and one or more policies, a workload allocation recommendation; and providing, to the workload initiator in response to the request, the workload allocation recommendation, wherein the workload initiator is to allocate the workload to one or more of the processing resources for execution by making a call to an operating system.

2. The method of claim 1, wherein the first GPU is an integrated GPU that is integrated with a central processing unit (CPU); and wherein the second GPU is a discrete GPU, and wherein the workload allocation recommendation specifies whether to utilize the integrated GPU or the discrete GPU for executing the workload.

3. The method of claim 1, wherein the plurality of processing resources further includes at least one of a video encoding/decoding accelerator, an audio encoding/decoding accelerator, a display controller, a bus interface controller, and a memory subsystem controller, and wherein the resource manager and the workload initiator are both included within a system memory.

4. The method of claim 1 further comprising:

exposing, to the workload initiator, an application programming interface (API) for submitting the request via an API call to the resource manager to request a recommended allocation, wherein the description of the workload is included as one or more arguments to the API call; and providing the workload allocation recommendation to the workload initiator as a response to the API call.

5. The method of claim 1, wherein the workload initiator comprises an application, wherein the workload is generated by the application, and wherein the application receives the workload allocation recommendation from the resource manager and selects the one or more of the processing resources based on the received workload allocation recommendation.

6. The method of claim 1 further comprising:

identifying the runtime utilization metrics and the one or more policies based at least on the description of the workload.

7. The method of claim 1, wherein generating, based on the utilization metrics and one or more policies, a workload allocation recommendation includes:

predicting, based on the runtime utilization metrics, a utilization impact on the plurality of processing resources in a particular workload allocation.

8. The method of claim 7, wherein a plurality of workload allocations is described in the one or more policies.

9. The method of claim 7, wherein generating, based on the utilization metrics and one or more policies, a workload allocation recommendation also includes:

scoring a plurality of workload allocations based on one or more factors specified in the one or more policies.

10. The method of claim 1 further comprising:

registering the workload initiator for a resource management notification; and notifying the workload initiator of resource availability in response to at least one of a change in capabilities and a change in utilization.

11. An apparatus for providing a service-based pipeline, the apparatus comprising a computer processor, a computer memory operatively coupled to the computer processor, the computer memory having disposed therein computer program instructions that, when executed by the computer processor, cause the apparatus to:

inspect, in response to a request that includes a description of a workload received from a workload initiator, runtime utilization metrics of a plurality of processing resources, wherein the plurality of processing resources includes at least a first graphics processing unit (GPU) and a second GPU;

generate, by a resource manager and based on the utilization metrics and one or more policies, a workload allocation recommendation; and provide, to the workload initiator in response to the request, the workload allocation recommendation, wherein the workload initiator is to allocate the workload to one or more of the processing resources for execution by making a call to an operating system.

12. The apparatus of claim 11, wherein generate, based on the utilization metrics and one or more policies, a workload allocation recommendation includes:

predict, based on the runtime utilization metrics, a utilization impact on the plurality of processing resources in a particular workload allocation.

13. The apparatus of claim 12, wherein a plurality of workload allocations is described in the one or more policies.

14. The apparatus of claim 12 wherein generate, based on the utilization metrics and one or more policies, a workload allocation recommendation also includes:

score a plurality of workload allocations based on one or more factors specified in the one or more policies.

15. The apparatus of claim 11 further comprising computer program instructions that, when executed, cause the apparatus to:

register the workload initiator for a resource management notification; and notify the workload initiator of resource availability in response to at least one of a change in capabilities and a change in utilization.

16. A computer program product for providing a service-based pipeline, the computer program product disposed upon a non-transitory computer readable storage medium, the computer program product comprising computer program instructions that, when executed, cause a computer to:

inspect, in response to a request that includes a description of a workload received from a workload initiator, runtime utilization metrics of a plurality of processing resources, wherein the plurality of processing resources includes at least a first graphics processing unit (GPU) and a second GPU;

generate, by a resource manager and based on the utilization metrics and one or more policies, a workload allocation recommendation; and provide, to the workload initiator in response to the request, the workload allocation recommendation, wherein the workload initiator is to allocate the workload to one or more of the processing resources for execution by making a call to an operating system.

17. The computer program product of claim 16, wherein generate, based on the utilization metrics and one or more policies, a workload allocation recommendation includes:

predict, based on the runtime utilization metrics, a utilization impact on the plurality of processing resources in a particular workload allocation.

18. The computer program product of claim 17, wherein generate, based on the utilization metrics and one or more policies, a workload allocation recommendation is performed atomically for a plurality of streams in a workload.

19. The computer program product of claim 17, wherein generate, based on the utilization metrics and one or more policies, a workload allocation recommendation also includes:

score a plurality of workload allocations based on one or more factors specified in the one or more policies.

20. The computer program product of claim 16 further comprising computer program instructions that, when executed, cause the computer to:

register the workload initiator for a resource management notification; and notify the workload initiator of resource availability in response to at least one of a change in capabilities and a change in utilization.

* * * * *